United States Patent
Gohda (10) Patent No.: US 7,693,401 B2
(45) Date of Patent: Apr. 6, 2010

(54) RECORDING APPARATUS USING DISC-LIKE RECORDING MEDIUM

(75) Inventor: Makoto Gohda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1359 days.

(21) Appl. No.: 10/535,272

(22) PCT Filed: Jun. 1, 2004

(86) PCT No.: PCT/JP2004/007907

§ 371 (c)(1),
(2), (4) Date: May 17, 2005

(87) PCT Pub. No.: WO02/104016

PCT Pub. Date: Dec. 27, 2002

(65) Prior Publication Data

US 2006/0062120 A1  Mar. 23, 2006

(30) Foreign Application Priority Data

Jun. 16, 2003 (JP) ............... 2003-170922

(51) Int. Cl.
H04N 5/00 (2006.01)
H04N 7/26 (2006.01)
H04N 9/04 (2006.01)
G06F 17/00 (2006.01)

(52) U.S. Cl. .............. 386/117; 386/124; 386/125; 386/128; 348/207.99; 701/104.1

(58) Field of Classification Search ............. 386/117, 386/124, 125, 128; 348/207.99; 701/104.1
See application file for complete search history.

(56) References Cited

U.S. PATENT DOCUMENTS

| 6,134,243 A | 10/2000 | Jones et al. | 370/465 |
| 2002/0149682 A1 | 10/2002 | Kudo | 348/231.4 |
| 2003/0133695 A1 | 7/2003 | Hirabayashi et al. | 386/68 |
| 2006/0062120 A1 | 3/2006 | Gohda | 369/53.2 |

FOREIGN PATENT DOCUMENTS

| EP | 1 085 515 A2 | 3/2001 |
| EP | 1 408 687 A1 | 4/2004 |
| JP | 9-213506 A | 8/1997 |

(Continued)

OTHER PUBLICATIONS

Dec. 19, 2005 International Preliminary Report of Patentability (with Jan. 5, 2006 Notification).

(Continued)

*Primary Examiner*—Thai Tran
*Assistant Examiner*—Syed Y Hasan
(74) *Attorney, Agent, or Firm*—Fitzpatrick, Cella, Harper & Scinto (57) ABSTRACT

A recording/reproducing apparatus for recording as a Quick-Time file a photographed motion image on a disc-like recording medium having plural recording areas different in characteristic. The plural areas include a first area guaranteeing a quick access speed and a second area which ensures a slower access speed than the first area. The recording/reproducing apparatus records a "movie" portion constituting the QuickTime file in the first area and a "media data" portion in the QuickTime file format in the second area.

8 Claims, 5 Drawing Sheets

FOREIGN PATENT DOCUMENTS

| | | | |
|---|---|---|---|
| JP | 2001-084705 | * | 3/2001 |
| JP | 2002-510165 | | 4/2002 |
| JP | 2002-314916 | | 10/2002 |
| WO | 02/056587 A1 | | 7/2002 |
| WO | 02/104016 A1 | | 12/2002 |

OTHER PUBLICATIONS

Aug. 31, 2004 International Search Report in PCT/JP2004/007907.
Aug. 31, 2004 Written Opinion in PCT/JP2004/007907.
Patent Abstracts of Japan, vol. 1997, No. 12, Dec. 25, 1997 (JP-A 9-213056, Aug. 15, 1997).

* cited by examiner

RECORDING APPARATUS USING DISC-LIKE RECORDING MEDIUM

TECHNICAL FIELD

The present invention relates to a recording apparatus, recording method, recording/reproducing apparatus and recording/reproducing method for an image and audio using a disc-like recording medium.

BACKGROUND ART

Recently, a camera integrated recording/reproducing apparatus (hereinafter referred to as a video camera) which adopts a disc-like recording medium (hereinafter referred to as disc), such as a digital versatile disc (DVD), as a recording medium has appeared. Such a video camera is constructed featuring random access characteristic of the recording medium which is not attained by a magnetic tape. For example, the aforementioned video camera can record video data and audio data of photographed scenes into a disc in the form of a file. Upon reproduction, each file can be accessed directly so that rapid reproduction operation can be attained easy and at high speed on a per file basis (regarding such a video camera, see Japanese Patent Application Laid-Open No. 2002-314916).

On the other hand, a data recording format in the "QuickTime" (trade mark) provided by Apple Computer Inc. in US (hereinafter referred to as just "QuickTime") has been well known as a multimedia tool for handling video data and audio data in the field of personal computer and the like. The QuickTime file format is an appropriate file format for handling multimedia data such as audio and video in time series and a file format based thereon has been adopted in Moving Picture Experts Group (MPEG)-4 (Regarding QuickTime, seen for example, Japanese Patent Application No. 2002-510165).

The file format of the QuickTime is constituted of, mainly, two sections, "media data" and "movie". The "media data" is actual data (data content) for video and audio. The "movie" is information needed for exchanging its "media data" between respective applications and holds additional information relating to that "media data".

Further, the QuickTime file format has two types in terms of holding the "media data" and "movie".

A first type is an independent file format in which the "media data" and "movie" are held in a single file. A second type is a reference file format in which the "media data" and "movie" are held in separate files.

In the case of the reference type, the "movie" file contains information of reference to the "media data" file. Generally, although in an application for file reproduction and the like, the QuickTime file is accessed through the "movie", the application does not need to take care of whether the file is of independent type or reference type as long as the QuickTime file is accessed through the "movie".

Here, a case where the aforementioned QuickTime file is applied to such a recording/reproducing apparatus as a video camera loaded with a rewritable disc is considered. In this case, the QuickTime file is recorded on a disc following universal disk format (UDF) which is a disc file system, but a following problem arises.

In the case of the reference type QuickTime file, since the files are recorded separately, a following problem arises at time of file copy. That is, although the "media data" and "movie" are related to each other as two files within the QuickTime file, they are recognized as two completely independent files under the UDF file system. Thus, even if coping of "movie" file is executed, the "media data" file is not copied to a copy destination. As a result, even if the copied "movie" is specified at the copy destination, an application for file reproduction cannot be executed because there is no actual data thereof, which is a problem.

On the other hand, the independent type QuickTime file has a following problem in terms of file operability. Generally, a disc drive having the UDF file system for a compact disc (CD) or a DVD has a slow data transmission speed and seek speed as compared to, for example, a hard disc drive, thereby taking a long time for file access. Additionally, because video data handled for the QuickTime file format is often of a large capacity, it takes an extremely long time to access that file, which is another problem.

DISCLOSURE OF THE INVENTION

An object of the present invention is to solve the above-described problems.

Another object of the present invention is to provide an apparatus for recording a QuickTime file or an equivalent file on a disc conforming to such a file system as UDF, more specifically, a recording apparatus and recording method which secures easiness in copying and high-speed access to a file and facilitate handling of the file.

As a preferred embodiment for such objects, the recording apparatus of the present invention, for recording motion image data onto a disc-like recording medium, comprises: file generating means for forming the motion image data into a file according to a procedure relating to QuickTime file format; and recording means for effecting recording as to the file generated by the file generating means, to record data unit including reference information included in the file in a first recording area on the disc-like recording medium and data unit including video data included in the file in a second recording area on the disc-like recording medium.

Further, a recording/reproducing apparatus of the present invention, for recording/reproducing motion image data onto a disc-like recording medium, comprises: file generating means for forming the motion image data into a file according to a procedure relating to QuickTime file format; recording means for effecting recording as to the file generated by the file generating means, to record data unit including reference information included in the file in a first recording area on the disc-like recording medium and data unit including video data included in the file in a second recording area on the disc-like recording medium; and reproducing means for reading out a file recorded on the disc-like recording medium by the recording means from the first recording area and the second recording area to reproduce the file.

Further, a recording method of the present invention, for recording motion image data onto a disc-like recording medium, comprises the steps of: generating a file so that the motion image data is formed into a file according to a procedure relating to QuickTime file format; and effecting recording as to the file generated in the file generating step, to record data unit including reference information included in the file in a first recording area on the disc-like recording medium and data unit including video data included in the file in a second recording area on the disc-like recording medium.

The recording/reproducing method of the present invention, for recording/reproducing motion image data onto a disc-like recording medium, comprises the steps of: generating a file so that the motion image data is formed into a file according to a procedure relating to QuickTime file format; effecting recording so that the file generated in the file generating step, to record data unit including reference information included in the file in a first recording area on the disc-like recording medium and data unit including video data included in the file in a second recording area on the disc-like recording medium; and reproducing a file recorded on the disc-like recording medium in the recording step by reading out the file from the first recording area and the second recording area.

Still other objects of the present invention, and the advantages thereof, will become fully apparent from the following detailed description of the embodiments.

BEST MODE FOR CARRYING OUT THE INVENTION

The preferred embodiments of the present invention will be described in detail hereinafter with reference to the accompanying drawings.

Figure 4:
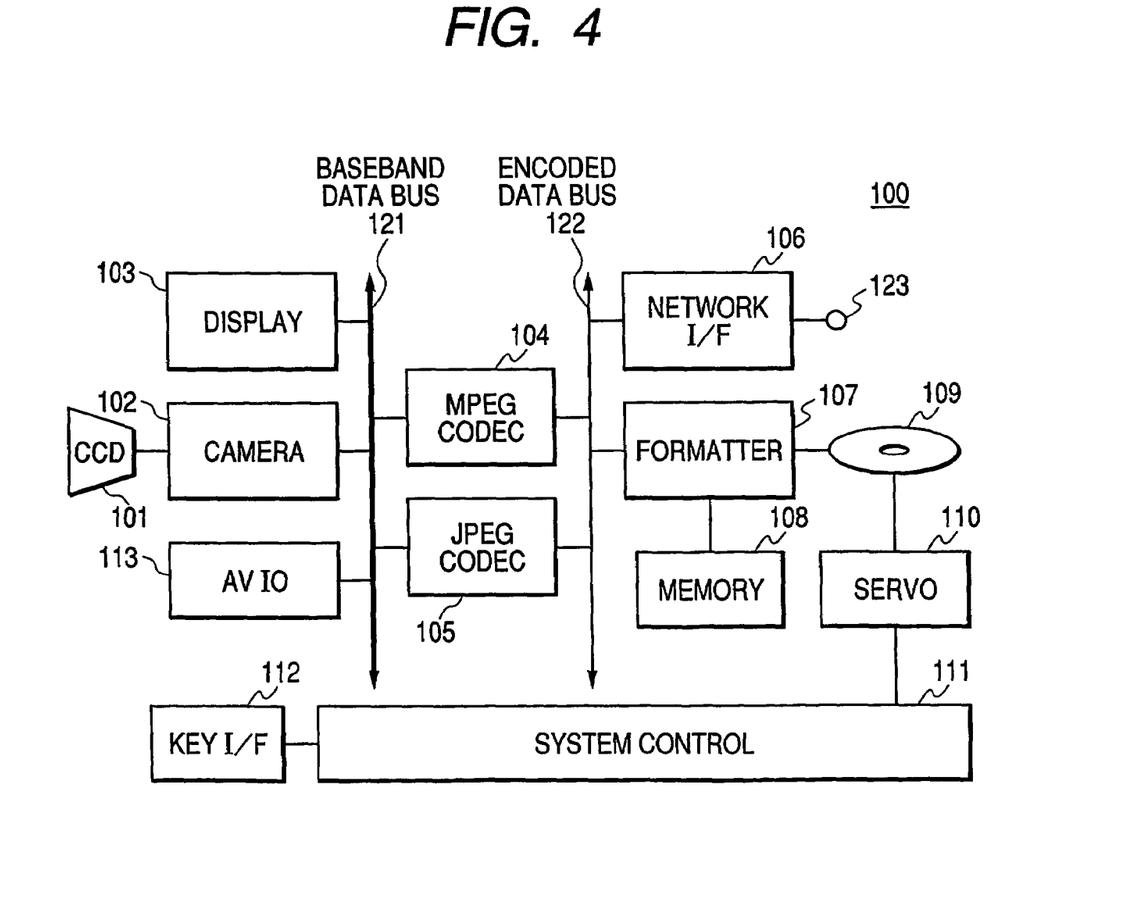
FIG. 4 is a structure block diagram of the recording/reproducing apparatus of the embodiment.

FIG. 4 shows the configuration of a recording/reproducing apparatus 100 according to an embodiment of the present invention. An example thereof is a camera integrated recording/reproducing apparatus that can record/reproduce an image (motion image and still image), such as a digital video camera.

Referring to FIG. 4, reference numeral 101 denotes an imaging system, which converts incident light to an electric signal. The imaging system 101 contains a sensor section such as a lens group, a CCD (or CMOS) and the like. Reference numeral 102 denotes a camera signal processing circuit, which executes analog-to-digital (A/D) conversion on an electric signal from the CCD into a digital signal so as to generate digital video data or digital still image data. Reference numeral 103 denotes a display, which displays color video image information relating to digital video data or digital still image data. The display 103 employs a liquid crystal panel as its display member.

Reference numeral 104 denotes motion image encoding/decoding circuit. This embodiment utilizes MPEG Codec. The MPEG Codec executes compression encoding/decoding on digital video data under the MPEG2 system. Reference numeral 105 denotes a still image encoding/decoding circuit. This embodiment utilizes JPEG Codec. The JPEG Codec executes compression encoding/decoding on the digital still image data under the JPEG system.

Reference numeral 106 denotes a network interface (I/F) circuit which achieves input/output (I/O) of compression-coded data. According to this embodiment, IEEE1394 or universal serial bus (USB) is employed as a network bus.

Reference numeral 107 denotes a format circuit (formatter) which carries out conversion and the like of data into a form suitable for recording and reproduction. More specifically, upon recording, it generates data content file comprising inputted MPEG or JPEG coded data and upon reproduction, restores the inputted data content file into the MPEG or JPEG coded data. Further, the format circuit 107 generates a QuickTime file for the aforementioned data content file. The generated QuickTime file includes data contents composed of the aforementioned MPEG coded data as the "media data" and further includes various kinds of additional information relating to the above-mentioned data contents as the "movie".

Further, the format circuit 107 includes a data modulation circuit for error correction and recording reproduction. Reference numeral 108 denotes a work memory such as a RAM used for the formatter 107.

Reference numeral 109 denotes a disc recording/reproducing section, which includes a disc-like recording medium, an optical pickup, a magnetic field applying section, a recording/reproducing member such as a rotary motor, and a recording/reproducing circuit. According to this embodiment, as a detachable disc-like recording medium, an optical disc or a magneto optical disc is employed. Its commercial type includes a DVD, Blu-ray and the like. Reference numeral 110 denotes a control circuit (servo) of the disc recording/reproducing section 109. On the disc-like recording medium, a generated QuickTime file (and data content file) is recorded according to the file control system such as UDF.

Reference numeral 111 denotes a system control circuit for controlling entirely the recording/reproducing apparatus 100, and reference numeral 112 denotes a key interface (key I/F) through which an operating instruction is to be inputted by a user. The system control circuit 111 comprises at least a CPU for controlling entirely, a ROM for storing program of the CPU and control data, and a RAM in which working areas, various kinds of tables and the like used by the CPU when it executes processing are defined. Reference numeral 113 denotes an audio video I/O circuit (AV IO) for inputting/outputting video signals and audio signals using an analog terminal (not shown), reference numeral 121 denotes a bus for base band data, reference numeral 122 denotes a bus for encoded data and reference numeral 123 denotes a digital I/O terminal to be connected to a network. The recording/reproducing apparatus 100 is constituted of the above-described configuration.

The recording/reproducing apparatus 100 utilizes the QuickTime file format as the structure of data to be recorded. Consequently, a function of operating data contents recorded on the disc-like recording medium more easily and more applicably can be provided. Although this embodiment utilizes the QuickTime file format, the present invention is not limited to this embodiment, but the present invention can be achieved also using a file format having the same configuration/function as the QuickTime or a configuration/function obtained by expanding or enhancing the QuickTime.

Subsequently, the operation of the recording/reproducing apparatus 100 will be described with reference to FIG. 4. First, a basic flow upon recording will be explained. An electric signal picked up by the imaging system 101 undergoes signal processing by the camera signal processing circuit 102 and after that, the signal is transmitted to the base band data bus 121. When the digital data on the base band data bus 121 is digital video data, it is fetched into the motion image encoding/decoding circuit (MPEG codec) 104 and if it is digital still image data, it is fetched into the still image encoding/decoding circuit (JPEG codec) 105.

In the case of motion image recording, video image information fetched into the motion image encoding/decoding circuit 104 is coded according to the MPEG2 system and the coded motion image data is transmitted to the format circuit 107 through the encoded data bus 122. The format circuit 107 packetizes inputted MPEG2 data as the MPEG2 stream so as to form a data content file and further, a recording file is formed according to the QuickTime file format. After that, the file is recorded on a disc-like recording medium within the recording/reproducing section 109 in the form of a motion image file (QuickTime file) according to the disc file system.

In the case of still image recording, image information fetched into the still image encoding/decoding circuit 105 is encoded in the unit of an image according to the JPEG system and the encoded still image data is transmitted to the format circuit 107 through the encoded data bus 122. The format circuit 107 encodes the inputted JPEG data according to the disc file system and after that, records onto the disc-like recording medium within the recording/reproducing section 109.

Upon the above-described recording operation and reproduction operation, which will be described later, the recording/reproducing section 109 executes optimum operation, so that the control circuit (servo) 110 controls the rotation of the disc and the posture of the pickup appropriately so as to record/reproduce data properly. The operation of the entire apparatus is controlled by the system control circuit 111 to ensure matching of the entire system. The system control circuit 111 interprets key input which is input by the user through the key interface 112 (for example, commands for "motion image recording", "still image recording", "reproduction start", "stop", "selection", "decision") and controls the operation of the entire system according to this interpretation.

Next, the operation upon reproduction will be described. If reproduction start is instructed by the user, a specified file or a file specified by default in the apparatus is read out from a recording medium and the reproduction is started.

If a file to be reproduced is a still image, the JPEG file recorded on the disc-like recording medium within the recording/reproducing section 109 is read out and after that, the format circuit 107 decodes the disc file system and outputs the JPEG data to the still image encoding/decoding circuit 105 through the encoded data bus 122. The still image encoding/decoding circuit 105 decodes the inputted JPEG data by expansion.

If a file to be reproduced is a motion image, a motion image file recorded on the disc-like recording medium within the recording/reproducing section 109 is read out and the format circuit 107 decodes the disc file system, and decodes and unpacketizes the QuickTime file. Then, the MPEG2 data is outputted to the motion image encoding/decoding circuit 104 through the encoded data bus 122. The motion image encoding/decoding circuit 104 decodes the inputted MPEG2 data by expansion.

Color video image information decoded by the motion image encoding/decoding circuit 104 or the still image encoding/decoding circuit 105 can be displayed on the display 103 through the base band data bus 121. Further, the audio video I/O circuit 113 can transmit color video image information flowing through the base band data bus 121 to an external TV monitor and the like in an analog form and display it.

Further, the reproduced MPEG2 data or JPEG data is outputted to the network interface circuit 106 through the encoded data bus 122 and can be outputted from the digital I/O terminal 123 to an external apparatus or a network in digital form. Further, digital data inputted to the digital I/O terminal 123 from an external apparatus or a network can be recorded in the recording/reproducing section 109. The operation of the recording apparatus 100 has been described above.

Next, the configuration of a motion image file which is generated by the format circuit (formatter) 107 in the recording/reproducing apparatus 100 will be described. According to this embodiment, a configuration for storing the motion image file according to the independent file format of the QuickTime will be described. Such QuickTime file format includes two factors, "movie" and "media data". Of them, the "movie" includes following atom information pieces (1) to (13) as indispensable atoms.

(1) Movie atom (2) Movie header atom (3) Track atom (4) Track header atom (5) Media atom (6) Media header atom (7) Video media information atom (8) Video media information header atom (9) Sound media information atom (10) Sound media information header atom (11) Data handler reference atom (12) Data information atom (13) Sample table atom According to this embodiment, as the "media data", the above-described MPEG2 stream is stored.

Figure 2:
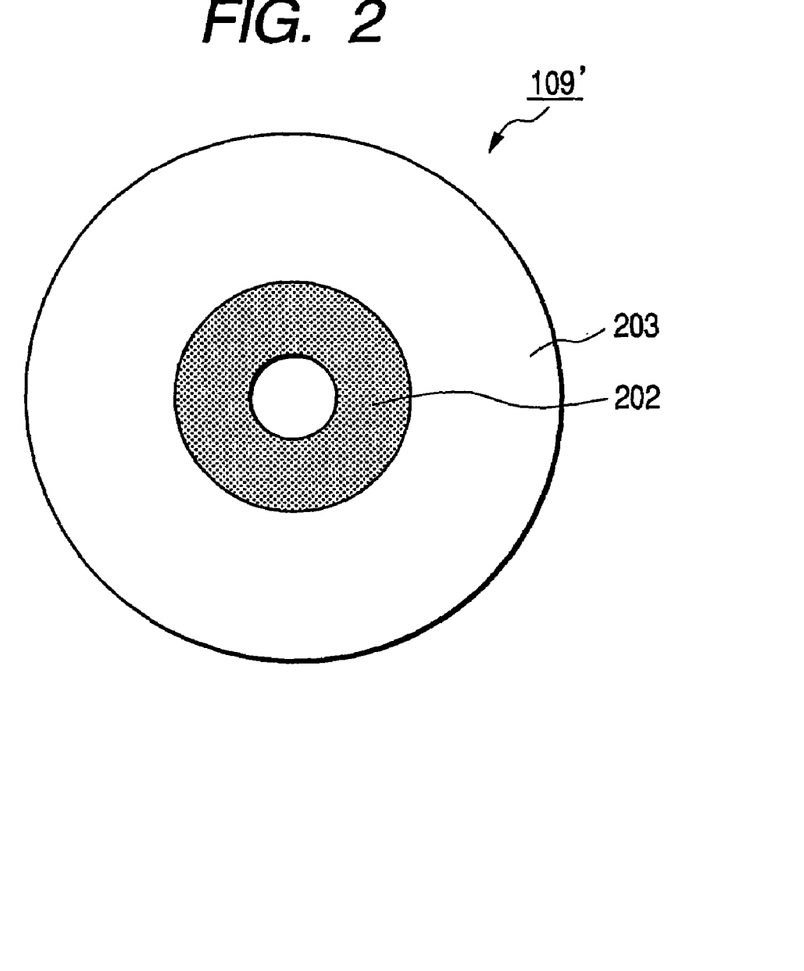
FIG. 2 is an image of a recording format on a recording medium, which is recorded by the recording/reproducing apparatus of the embodiment.

Further, regarding recording of the QuickTime file generated by the format circuit 107, FIG. 2 shows a diagram for explaining the recording areas for "movie" and "media data". Referring to FIG. 2, reference numeral 109' of the disc denotes a disc-like recording medium within the recording/reproducing section 109 shown in FIG. 4. Reference numeral 202 denotes a special area which is disposed on an inner peripheral portion of a disc, which ensures a quick access speed, and records the "movie", and reference numeral 203 denotes general area constituted of other areas which records the aforementioned "media data". The recording/reproducing section 109 in the recording/reproducing apparatus 100 sorts data into the form shown in FIG. 2 and records data on a disc.

Figure 3:
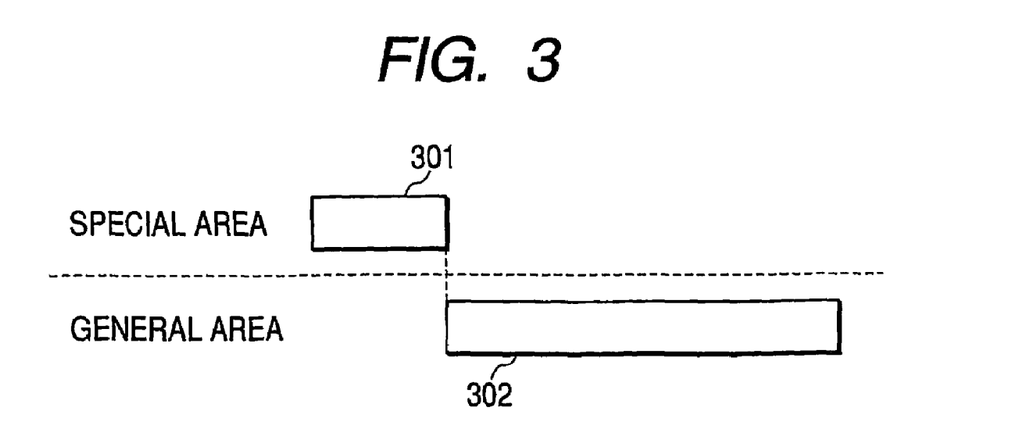
FIG. 3 is a structural diagram of a file generated by the recording/reproducing apparatus of the embodiment.

In case that the disc logical format is UDF, the UDF file control system which enables divisional recording of a file is used to attain a recording method. For example, according to this embodiment, the file divisional recording shown in FIG. 3 is achieved by the UDF. Referring to FIG. 3, reference numeral 301 denotes a front half portion of the division of the file, which corresponds to the "movie" to be recorded in the special area 202. Reference numeral 302 denotes a rear half portion of the division of the file, which corresponds to the "media data" to be recorded in the general area 203.

To ensure the recording configuration of the disc 109' as shown in FIG. 2, it is necessary to secure the special area 202 for storing the "movie" by a "movie" area securing processing and distinguish it from the general area 203. In the meantime, the special area 202 for storing the "movie" is preferred to be of a continuous area. For the special area 202 to be accessed rapidly as shown in FIG. 2, it is preferred to secure an area at a certain distance from the center of the disc 109', so that access to the "movie" file is accelerated.

Next, the securing processing of the "movie" area (special area 202) will be described. Although the UDF enables a specific directory to preliminarily secure (reserve) a disc area which can be used only by files existing under that directory, this embodiment provides a configuration for securing the "movie" area by forming an "area file" having a file size of the "movie" area. This securing processing of the "movie" area is executed at an arbitrary timing according to a user's instruction after the disc is initialized. Alternatively, this may be automatically processed interlocking with the initialization of the disc.

Securing the "movie" area by forming the area file is effective for a file system having no means for securing the disc area preliminarily. If the "movie" is stored by the file recording processing which will be described later, the size of the area file decreases by an amount corresponding to that "movie". That is, the total of the size of the stored "movie" and the size of the area file is always equal to the size of the special area 202 shown in FIG. 2. It is desirable to avoid deleting erroneously the area file by making the file attributes invisible to the user or inhibiting writing into the file. The configuration of the motion image file and its recording processing have been described above.

Figure 5:
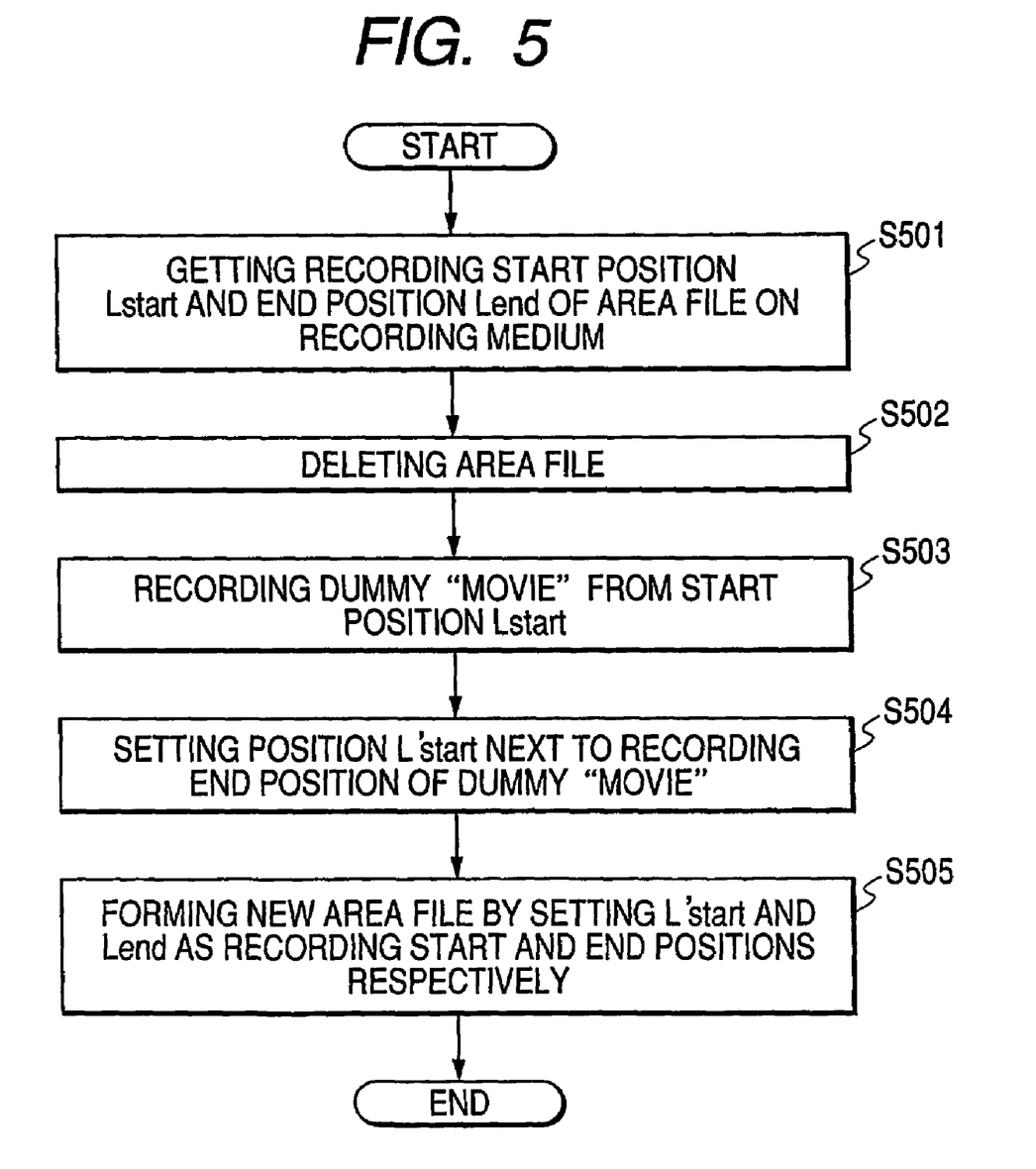
FIG. 5 is a flow chart of area file processing to be executed by the recording/reproducing apparatus of the embodiment.
Figure 6:
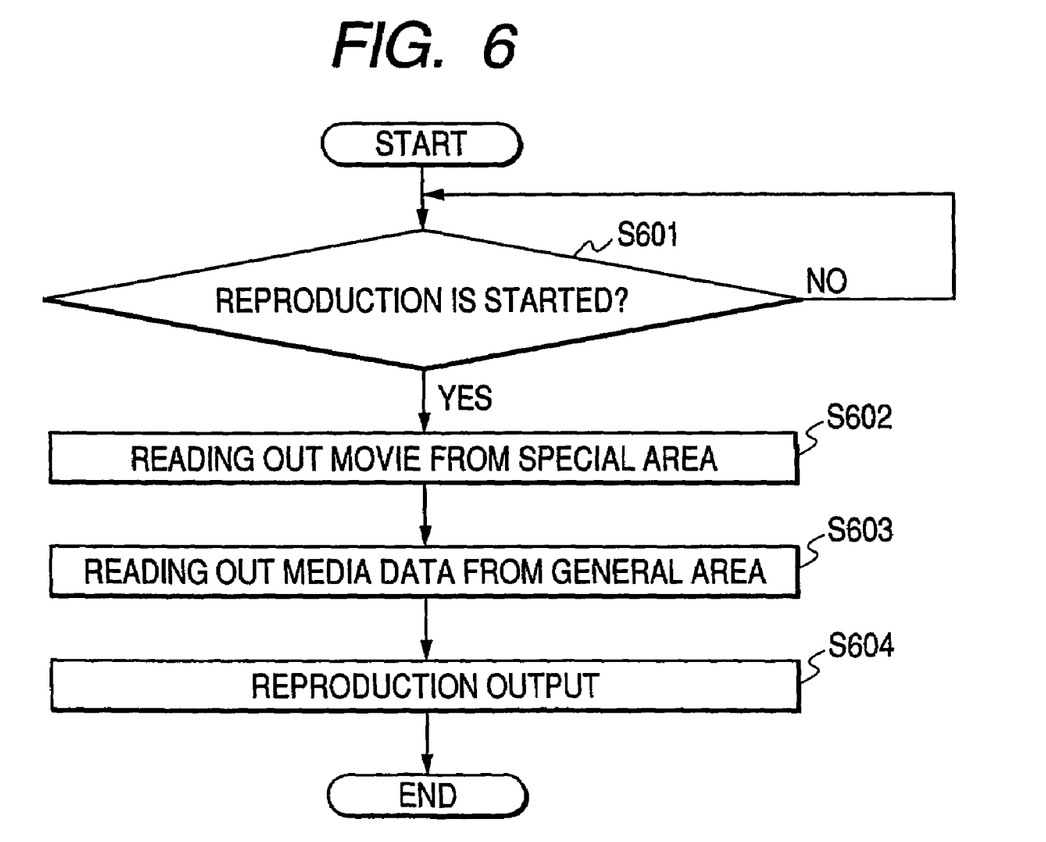
FIG. 6 is a flow chart of reproduction processing to be executed by the recording/reproducing apparatus of the embodiment.

The recording processing and reproduction processing of the recording/reproducing apparatus 100 of this embodiment will be described with reference to the flow charts of FIGS. 1, 5 and 6. These flow charts represent the procedure of each processing which is executed by controlling the system control circuit 111.

Figure 1:
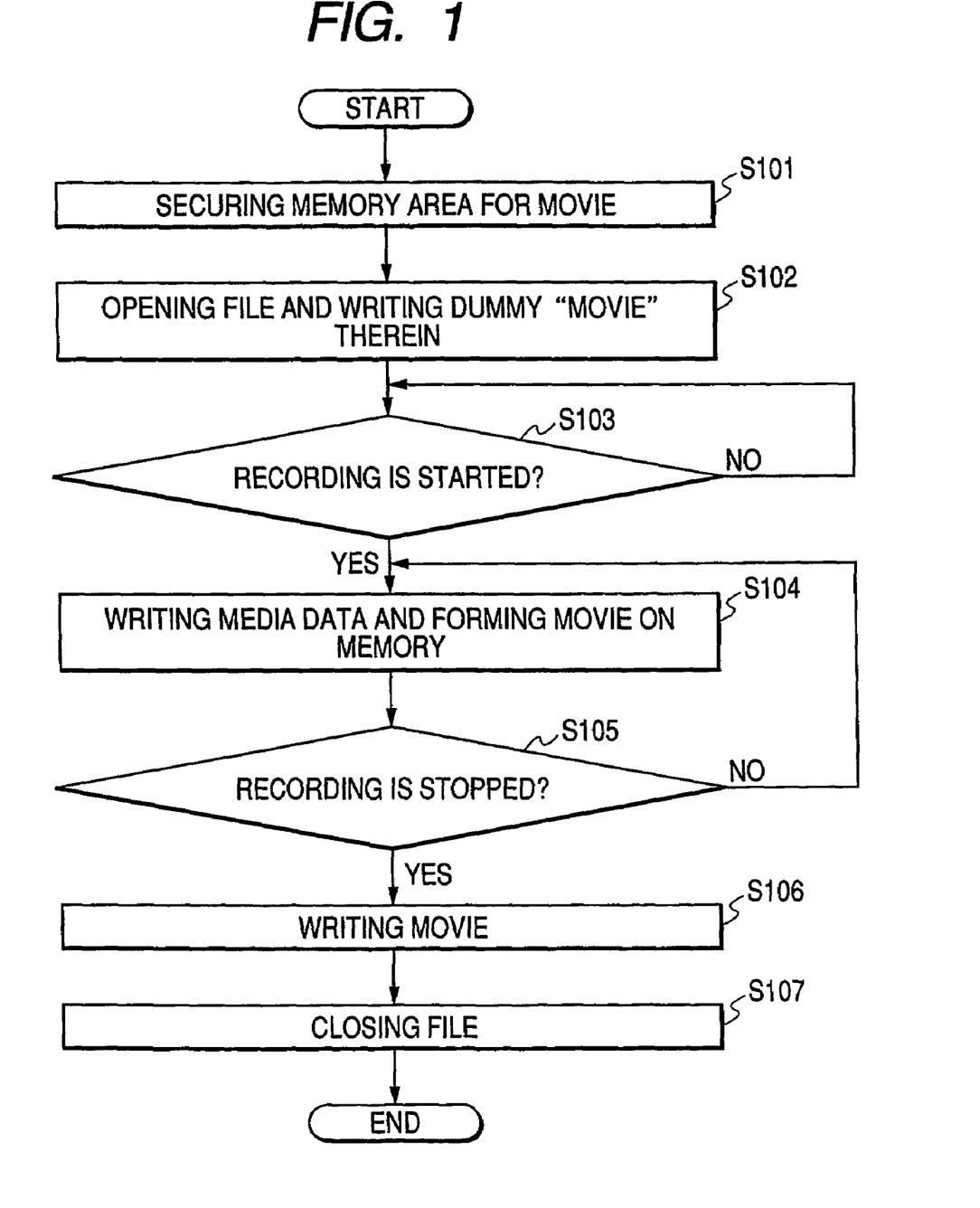
FIG. 1 is a flow chart of recording processing to be executed by a recording/reproducing apparatus according to an embodiment of the present invention.

FIG. 1 is a flow chart showing the processing from formation of a motion image file or QuickTime file to recording into the disc.

First, assume a state in which photographing is carried out and standby mode for recording is being executed. At this time, at step S101, a memory area for "movie" is secured on the work memory 108. Next, as step S102, a file for write-in is opened on the disc 109' within the recording/reproducing section 10' 109. At this time, in order to secure an area in which the "movie" is to be written at the head of the file, a dummy "movie" is written in. This dummy "movie" is written into the special area 202. By decreasing the area securing file as much as the capacity of this dummy "movie", the total capacity of the special area 202 is prohibited from changing.

The processing at step S102 will be described with reference to a detailed flow chart shown in FIG. 5. First, as step S501, a recording start position Lstart of the area file in the disc 109' which is a recording medium and a record end position Lend are obtained. According to this embodiment, the Lstart and Lend are designated with, for example, a sector number. Next, as step S502, that area file is deleted to use part of this area file (portion from the head) to store the dummy "movie". Then, as step S503, the dummy "movie" is recorded with the position of the Lstart on the recording medium as a record start position and the procedure proceeds to step S504. At step S504, a sector number next to the record end position of the dummy "movie" is acquired and regarded as L'start. Further, at step S505, a new area file is formed with the record start position as L'start and record end position as Lend, and the flow of FIG. 5 is terminated. As a result of the above-described processing, the dummy "movie" is recorded at the head of the area secured by the area file (which coincides with the special area 202 in the initial state) and a remaining area is secured with the new area file.

After the preliminary preparation ends, the procedure is returned to the flow of FIG. 1, in which at step S103, the procedure waits for user's input of the record start. If the record starts by user's depressing a record button, at step S104, writing of the "media data" constituted of the MPEG2 stream data onto the disc and formation of the "movie" on the memory 108 are executed. The "media data" is written into a file opened at the aforementioned step S102 and as an area, which this writing is executed onto the general area indicated by reference numeral 203 in FIG. 2. Writing into discontinuous sectors is guaranteed by the file system according to the UDF rule. In parallel to this, the "movie" is formed on the memory 108. Since the "movie" includes data such as preview length which is property of the media "data", and reference information to each sample of the "media data", data is not established until the recording ends. Therefore, the recording operation at step S104 is repeated until the user inputs end of record.

If the user depresses a stop button to instruct the end of recording, this is determined at step S105 and the procedure is escaped from the loop. Next, at step S106, finally secured "movie" data on the memory 108 is written into the "movie" area on the disc secured at step S102 in the form of a file, and the file is closed at step S107 to terminate the recording operation. Above is the description of the recording processing flow.

The processing at the time of reproduction of the motion image file (QuickTime file) will be described with reference to the flow chart of FIG. 6. If start of reproduction is instructed by the user at step S601 in FIG. 6, first, the "movie" file is read out from the special area 202 of the disc 109' at step S602. Next, at step S603, the "media data" corresponding to the read out "movie" is read out from the general area 203. The "media data" to be read out is determined by identifying the reference information and the like included in the read "movie". As a result, at step S604, the QuickTime file is reproduced and MPEPG2 stream data corresponding to the reproduced "media data" is decoded to be reproduced and outputted. Above is the description about the reproduction processing flow.

As a result of the above-described series of operations, a single independent QuickTime file, in which the "movie" is disposed in the special area 202 on the inner peripheral portion having a higher access speed while the "media data" is disposed in the general area 203 on an outer peripheral portion having a lower access speed, can be formed. Upon normal reproduction, if a file recorded according to the file system is opened, the reproduction can be carried out without any difference from handling of an ordinary QuickTime file. Upon file copying, the copying can be executed without any difference from handling of a proper independent QuickTime file. As for the file operability such as sort and retrieval, since the "movie" portion of each QuickTime file is disposed such that it is concentrated on the inner peripheral portion guaranteeing a quick access, the entire circumference of the disk does not need to be accessed, thereby achieving a very comfortable response.

Even if the configuration is changed into the one for generating the reference type QuickTime file as a QuickTime file, which is generated in the recording/reproducing apparatus 100 of this embodiment, if the "movie" generated in the same method as the above-described one is disposed in the special area 202 on the inner peripheral portion of the disc while the "media data" (data contents) composed of the MPEG2 stream data is disposed in the general area 203 on the outer peripheral portion of the disc for recording, the operability and access speed are improved.

OTHER EMBODIMENTS

Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R, a DVD-RW and a DVD-RAM).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The invention claimed is:

1. A recording apparatus for recording motion image data onto a disc-like recording medium, the apparatus comprising:
   a file generating unit that forms the motion image data into a file according to a procedure relating to QuickTime file format; and
   a recording unit that effects recording of the file generated by the file generating unit such that the file is recorded as (a) a first file including reference information of the motion image data included in the file and (b) a second file including the motion image data included in the file, in first and second recording areas on the disc-like recording medium, respectively,
   wherein the recording unit records the first and second files such that dummy data of the first file is recorded in the first recording area during stand-by of recording of the motion image data, the second file is recorded in the second recording area during recording of the motion image data, and the first file is recorded in the first recording area instead of the dummy data recorded therein after the recording of the motion image data is completed.

2. An apparatus according to claim 1, wherein the recording unit secures an area accessible at higher speed among recording areas on the disc-like recording medium as the first recording area, and a recording area having a slower access speed than the first recording area as the second recording area.

3. An apparatus according to claim 2, wherein the recording unit is arranged so that the first recording area is disposed on an inner peripheral portion of the disc-like recording medium while the second recording area is disposed on an outer peripheral portion of the disc-like recording medium.

4. An apparatus according to claim 1, wherein the first file is a "movie" file which is specified by QuickTime while the second file is a "media data" file which is specified by QuickTime.

5. An apparatus according to claim 1, further comprising:
   an imaging unit that generates the motion image data by a photographing operation, wherein the file generating unit carries out forming of the motion image data generated by the imaging unit into a file in parallel to the photographing operation.

6. An apparatus according to claim 5, further comprising:
   a compressing unit that compresses the information amount of the motion image data picked up by the imaging unit,
   wherein the file generating unit forms the motion image data compressed by the compressing unit into a file according to the procedure relating to the QuickTime file format.

7. A recording method for recording motion image data onto a disc-like recording medium, the method comprising the steps of:
   generating a file so that the motion image data is formed into a file according to a procedure relating to QuickTime file format; and
   effecting recording of the file generated in the file generating step such that the file is recorded as (a) a first file including reference information of the motion image data included in the file and (b) a second file including the motion image data included in the file, in first and second recording areas on the disc-like recording medium, respectively,
   wherein the recording step records the first and second files such that recording dummy data of the first file is recorded in the first recording area during stand-by of recording of the motion image data, the second file is recorded in the second recording area during recording of the motion image data, and the first file is recorded in the first recording area instead of the dummy data recorded therein after the recording of the motion image data is completed.

8. A storage medium for storing a program to be executed by a computer, the program comprising:
- a file generating step of generating a file so that the motion image data is formed into a file according to a procedure relating to QuickTime file format; and
- a recording-controlling step of effecting recording of the file generated in the file generating step such that the file is recorded as (a) a first file including reference information of the motion image data included in the file and (b) a second file including the motion image data included in the file, in first and second recording areas on the disc-like recording medium, respectively, wherein the recording-controlling step records the first and second files such that recording dummy data of the first file is recorded in the first recording area during stand-by of recording of the motion image data, the second file is recorded in the second recording area during recording of the motion image data, and the first file is recorded in the first recording area instead of the dummy data recorded therein after the recording of the motion image data is completed.

* * * * *